United States Patent [19]
Elms

[11] 3,764,908

[45] Oct. 9, 1973

[54] ELECTRONIC WATTMETER INCLUDING A SOLID-STATE LOGARITHMIC MULTIPLIER

[75] Inventor: Robert T. Elms, Monroeville, Pa.

[73] Assignee: Westinghouse Electric Corporation, Pittsburgh, Pa.

[22] Filed: Mar. 6, 1972

[21] Appl. No.: 232,025

[52] U.S. Cl............. 324/142, 235/194, 307/229, 328/160
[51] Int. Cl.......................... G01r 21/00, G06g 7/16
[58] Field of Search.................... 324/142; 307/229; 328/160; 235/194

[56] References Cited
UNITED STATES PATENTS
3,197,626 7/1965 Platzer........................... 328/160 X
3,423,578 1/1969 Platzer et al...................... 307/229

OTHER PUBLICATIONS
Savant et al.; Elec. Sept, 1954; pp. 144–147.

Primary Examiner—Alfred E. Smith
Attorney—A. T. Stratton et al.

[57] ABSTRACT

An electronic wattmeter includes a solid-state logarithmic multiplier of the single quadrant type for measuring true instantaneous values alternating current power. The logarithmic multiplier computes the product of the instantaneous absolute values of a current component and a voltage component defining an alternating current power quantity to be measured. The logarithmic multiplier includes compensating and sensitivity corrections for increasing accuracy and reliability. A product of the polarity logic senses the relative states of polarity of the voltage and current components. A polarity restorer inverts the logarithmic multiplier output signal in response to opposite polarity states of the voltage and current components as sensed in the logic. The electronic wattmeter output signal is provided at the polarity restorer output so as to be indicative of the true instantaneous values of the alternating current.

11 Claims, 7 Drawing Figures

ELECTRONIC WATTMETER INCLUDING A SOLID-STATE LOGARITHMIC MULTIPLIER

BACKGROUND OF THE INVENTION

1. Field of the Invention

This invention relates to electronic wattmeters and more particularly to an improved electronic wattmeter including a solid state logarithmic multiplier circuit and to improved logarithmic multiplier circuits having increased accuracy and sensitivity characteristics.

2. Description of the Prior Art

It is known to use electronic tube and semiconductor devices having logarithmic input-output characteristics as logarithmic and anit-logarithmic computing devices in multiplier circuits and to use such multiplier circuits for electrical power measuring. For example, in U.S. Pat. No. 2,486,068 diode and pentode electronic tubes defined computing devices for deriving logarithmic output signals from the voltage and current components of a R.F. power circuit to be measured. The computed logarithmic current and voltage signals are electrically summed and applied to a variable mu electronic tube operated as an anti-logarithmic computing device. The output of the variable mu tube develops a power output signal corresponding to the product of the voltage and current components and and therefore to the R.F. power to be measured.

In U.S. Pat. No. 3,197,626 a semiconductor logarithmic multiplier forming an electronic wattmeter is described utilizing the logarithmic current versus voltage characteristics across a pn semiconductor junction. Although the solid-state devices enable a more compact logarithmic multiplier circuit arrangment, the inherent transfer and thermally sensitive operating characteristics of solid-state devices have been noted as limiting the desired accuracy and response of solid-state logarithmic multipliers in certain applications.

Further, logarithmic multipliers are typically utilized in a single quadrant mode, that is, input signals for which the product is to be computed must have common polarities. In the aforementioned U.S. Pat. No. 3,197,626, power measurement in all four quadrants is made for the current and voltage power components by using a pair of logarithmic multipliers. Each multiplier is provided with a biasing signal which is carefully controlled and precisely balanced relative to the other biasing signal. The biasing signals are precisely cancelled to derive the instantaneous power indicating signal so as to not introduce any error due to the biasing signals.

SUMMARY OF THE INVENTION

In accordance with the present invention, an electronic wattmeter utilizes an improved single quadrant solid-state logarithmic multiplier so as to provide four quadrant operation. A signal conditioner receives the current and voltage power components and develops analog signals corresponding to the absolute values of the current and voltage components to be applied to the logarithmic multiplier. The signal conditioner further develops logic signals formed by digital pulses corresponding to the instantaneous polarity of each current and voltage power component. These logic signals are applied to a product of the polarity logic. The logarithmic multiplier includes a pair of semiconductor input computing devices each having an input supplied by one of the voltage and current analog input signals. A semiconductor output computing device in the multiplier is connected in series with the pair of input computing devices so as to be responsive to the sum of the outputs across the pair of input computing devices. A computed signal is derived at the output computing device so as to be proportional to the product of the analog voltage and current input signals. The operating point of the output computing device is accurately maintained so that the multiplier output signal variations have minimal undesired affect upon the summed signals of the pair of input devices.

A polarity restorer receives the multiplier output signal and is controlled by polarity product pulses received from the logic. The polarity restorer reverses the polarity of the logarithmic multiplier output signal by inverting the output signal when the current and voltage power components have opposite polarities. This develops a power indicating signal at the output of the electronic wattmeter which is related to the product of the instantaneous phase and amplitude voltage and current components of the power to be measured. Accordingly, a single quadrant logarithmic multiplier is utilized to provide instantaneous alternating current power indications and is an important feature of this invention.

Modified solid state logarithmic multipliers of a single quadrant type are provided in accordance with this invention to increase the accuracy in the electronic wattmeter output. In one embodiment a field effect transistor (FET) is connected to the collector of a transistor output computing device so that the input to the output computing device is made substantially independent of its output voltage and current. The FET forms a series control element which regulates the collector voltage of the output computing device at a stable operating point and substantially reduces any output voltage variations. This mitigates the effects of collector voltage variation on the base current of the output device due to its transistor transfer characteristics. In another improved logarithmic multiplier, a compensating circuit shunts the base to emitter current of the transistor output computing device so as to reduce circulating base current of the output device through the pair of input computing devices. This provides beta compensation by connecting a transistor with identical matching characteristics to the base of the transistor output computing device. An identical base current signal is derived at the base of the transistor output computing device. This provides a path for the base current so as to define a base current loop excluding the outputs of the pair of input computing devices.

BRIEF DESCRIPTION OF THE DRAWINGS

For a better understanding of this invention, reference may be had to the preferred embodiments of the present invention as shown in the accompanying drawings, in which.

DESCRIPTION OF THE PREFERRED EMBODIMENTS

Figure 1:
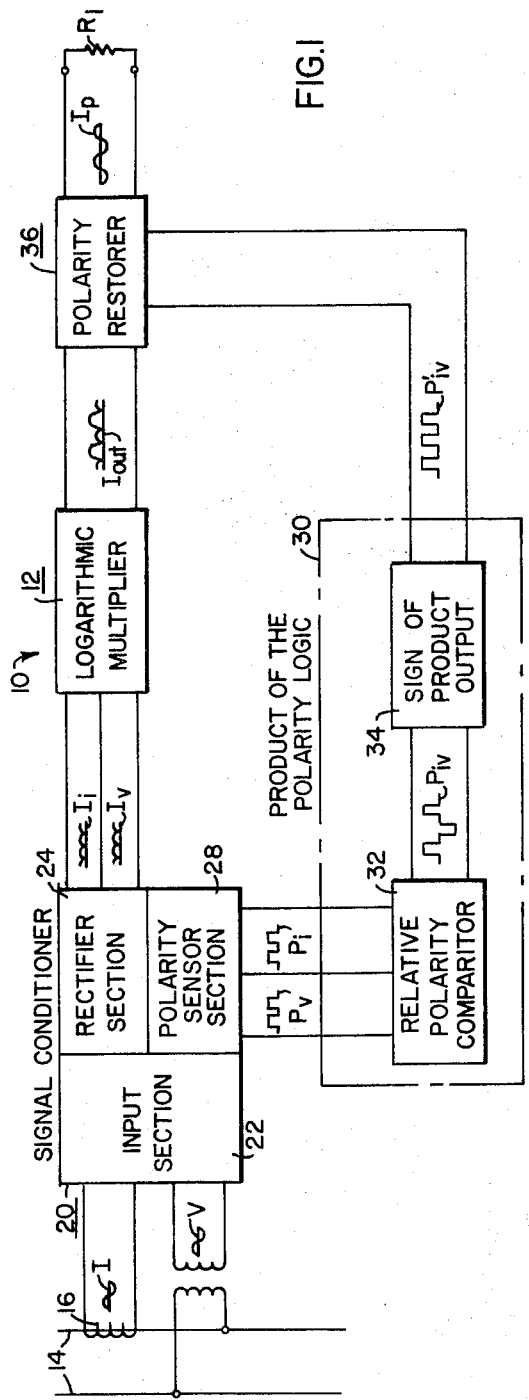
FIG. 1 is a schematic block diagram of an electronic wattmeter including a logarithmic multiplier made in accordance with this invention.

Referring to the schematic block diagram of FIG. 1, a preferred embodiment of the electronic wattmeter of this invention is shown and is generally designated by the reference numeral 10. A solid state logarithmic multiplier 12 is included in the wattmeter 10 for deriving the product of two input signals and forms an important feature of the present invention. The logarithmic multiplier 12 is a single quadrant type operative to receive two input signals both having a common positive reference polarity. A current component I and a voltage component V of an alternating current power to be measured define the two inputs to the wattmeter 10. The power to be measured flows in a metered circuit formed, for example, by a pair of transmission line conductors 14. In one intended use of the electronic wattmeter of this invention, the pair of conductors 14 carry conventional and commercially available electrical power having a frequency of 60 Hertz. A suitable current transformer 16 is coupled to one of the pair of conductors 14 and a predetermined current level of the current component I is developed so as to have a peak level in the order of 5 amperes. A suitable potential transformer 18 is connected across the conductors 14 to develop a predetermined voltage level of the voltage component V which is in the order of 120 volts.

A signal conditioner 20 has a pair of inputs in an input section 22 for receiving the current I and the voltage V. The current I and voltage V are conditioned as to current and voltage levels in both analog and digital information bearing signals for application to the solid-state circuitry included in the logarithmic multiplier 12 and other circuits of the electronic wattmeter 10. A rectifier section 24 of the conditioner 20 rectifiers the current I and voltage V so that varying direct current signals of common polarities are developed. First and second outputs of the rectifier section 24 develop an analog current input signal $I_i$ and an analog voltage input signal $I_v$. Signals $I_i$ and $I_v$ have variable current amplitudes defining first and second input signals for the logarithmic multiplier circuit 12 corresponding to the instantaneous amplitude of current I and voltage V. The signal conditioner 20 also includes a polarity sensor section 28 for developing two digital logic signals forming digital pulse signals $P_i$ and $P_v$ each having either of two voltage levels corresponding to the polarity of the current and voltage components I and V, respectively. The logarithmic multiplier 12 develops an output by means of semiconductor logarithmic and antilogarithmic computing devices as described in detail hereinbelow.

The logarithmic multiplier 12 is a single quadrant type so that the computer output signal $I_{out}$ corresponds to the product of the instantaneous absolute values of the input signals $I_i$ and $I_v$, both varying between zero and positive current levels. Accordingly, the multiplier output signal $I_{out}$ is not responsive to the true instantaneous product of the current and voltage components I and V when they have opposite polarities. Accordingly, a product of the polarity logic 30 receives the pulse signals $P_i$ and $P_v$ and derives a polarity product logic pulse signal $P_{iv}$ in a relative polarity comparator 32, as described hereinbelow. The signal $P_{iv}$ is digital pulses having three voltage levels developed in response to signals $P_i$ and $P_v$ having common positive, common negative, and opposite voltage levels. A sign of product logic output 34 develops a digital pulse signal $P'_{iv}$ at the output of the logic 30 having two voltage levels in response to the pulse signals $P_{iv}$ to provide an on-off switching function. A polarity restorer 36 is operative to invert the output signal $I_{out}$ of the logarithmic multiplier 12 when opposite polarities exist in the current I and voltage V. This develops an output at the polarity restorer 36 that forms a power indicating signal $I_p$ at the output of the electronic wattmeter 10. The output signal $I_p$ is variable current indicative of the true instantaneous product of the magnitude and phase of the current I and voltage V.

Figure 3:
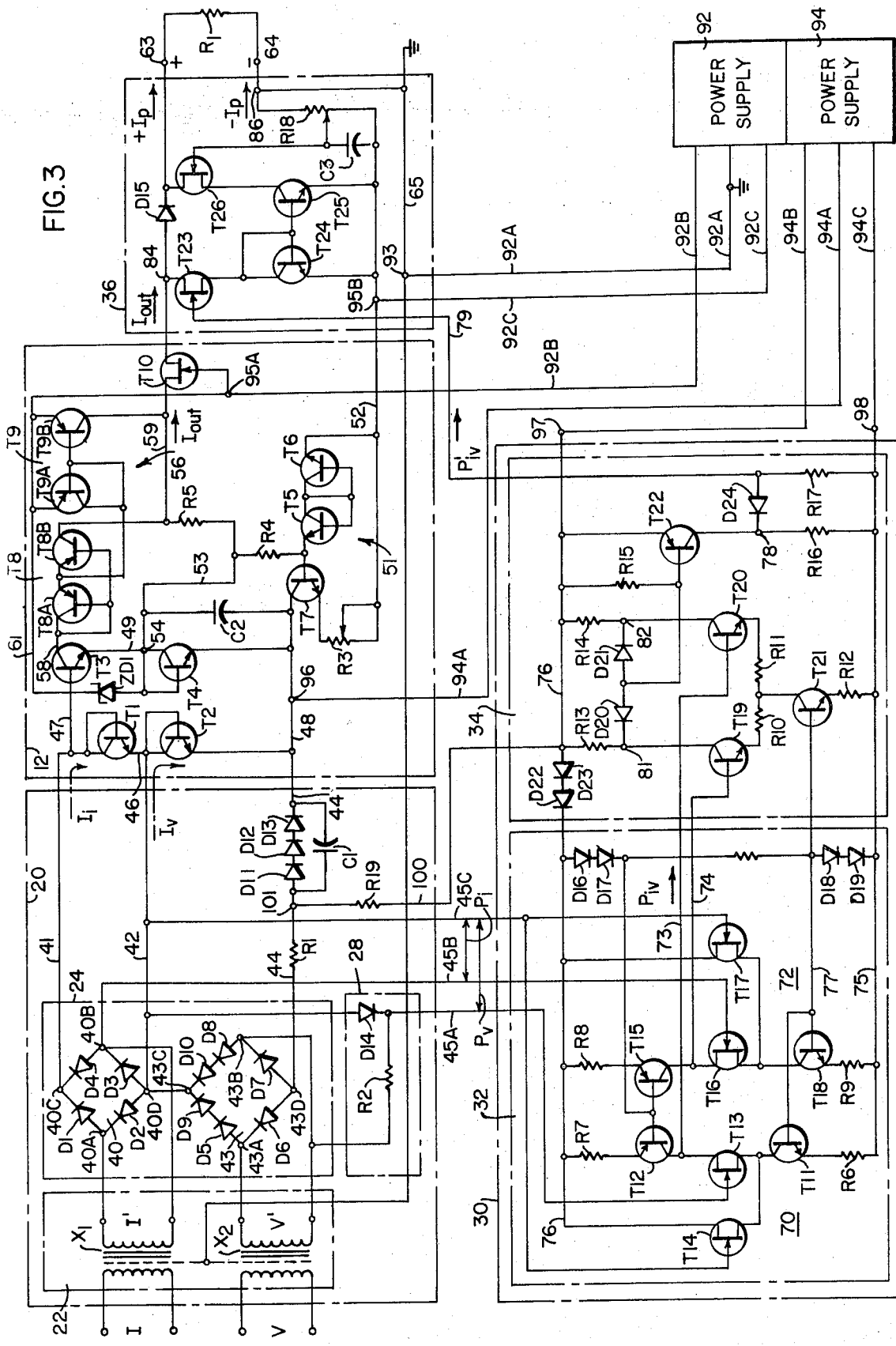
FIG. 3 is a schematic circuit diagram of the electronic wattmeter illustrated in the schematic block diagram of FIG. 1.

Referring now to the detail schematic circuit diagram shown in FIG. 3 corresponding to the electronic wattmeter 10 illustrated in the schematic block diagram of FIG. 1. The input conditioner circuit 20 includes a first transformer X1 having a secondary connected to the current component I. The first input transformer X1 has a 1 to 10,000 turns ratio with the secondary being connected to the current component I for reducing the current level. A second input transformer X2 includes a turns ratio of 2.5:1 with a primary winding connected to the voltage component V. The reduced current component signal I' is produced at the primary of the transformer T1 and the reduced voltage component signal V' is developed across the secondary of the transformer X2 for application to the rectifier section 24.

The rectifier section 24 includes a first full wave rectifier bridge 40 formed by four diodes D1, D2, D3 and D4 connected together in a conventional manner. The input junctions 40A and 40B of the rectifier bridge 40 are connected to the secondary of the transformer X1 and the output junctions 40C and 40D are connected across the conductors 41 and 42, respectively. A second full wave rectifier bridge 43 is included in the rectifier section 24 and is formed by the four diodes designated D5, D6, D7 and D8. The input junctions 43A and 43B to the rectifier bridge 43 are connected to the secondary of the transformer X2. Diodes D9 and D10 are each connected in separate positive legs of the rectifier bridge 43 so as to be in series with an output junction 43C of the second rectifier bridge 43 which is connected to the conductor 42 and in common with junction 40D. The diodes D9 and D10 develop additional voltage drops thereacross for operation of the circuits in the relative polarity comparator 32 described in detail hereinbelow. Another output junction 43D of the second rectifier bridge 43 is connected to conductor 44 which includes a series connected resistor R1 having a high resistance values and further includes three serially connected diodes designated D11, D12, and D13 connected as a group across a capacitor C1. The resistor R1 is effective to convert the voltage V to a variable current forming the analog voltage input signal $I_v$. The three series diodes compensate for the voltage drops added to the output of the second rectifier bridge 43 by the diode D9 and D10 thereby maintaining the output of the bridge circuit 40 in a balanced proportional relationship to the input.

The rectifier bridge 40 develops the analog current input signal $I_i$ flowing through the conductors 41 and 42 and having an absolute current value equal to the current component I divided by a factor of 10,000. The analog voltage input signal $I_v$ flows through the conductor 42 and 44 and has an absolute current value equal to the voltage component V divided by 250,000 volts/amps. This reduces the voltage and current components I and V to suitable varying current levels, so-called small signals, for operation by solid-state integrated circuit devices forming the remaining active circuit elements of the electronic wattmeter 10.

The polarity sensor 28 is partially formed by the rectifier bridges 40 and 43 and a clamping diode D14 and a current limiting resistor R2 which are operative with the diodes D8 and D10 for clamping the output of the rectifier bridge 43 at predetermined levels. Conductors 45A, 45B and 45C are connected to the outputs of the rectifier bridges and form the output conductors of the polarity sensor 28. The conductor 45C forms a reference conductor and is connected to the conductor 42. The diode D14 is connected in series with the resistor R2 and and this series combination is connected across the bridge junctions 43B and 43C. The conductor 45A is connected to the junction between the resistor R2 and diode D14. The conductor 45B is connected to the bridge 40B and the component values cause the signal I' to be changed. The diodes switch as the signals V' and I' pass through zero which develops the positive and negative portions of the digital pulse signals $P_v$ and $P_i$ at either a constant positive value or a constant negative value, for example either plus 1 volt or minus 1 volt. The digital pulse signals $P_i$ and $P_v$ appear across the pairs of conductors 45B–45C and 45A and 45C, respectively.

Figure 2:
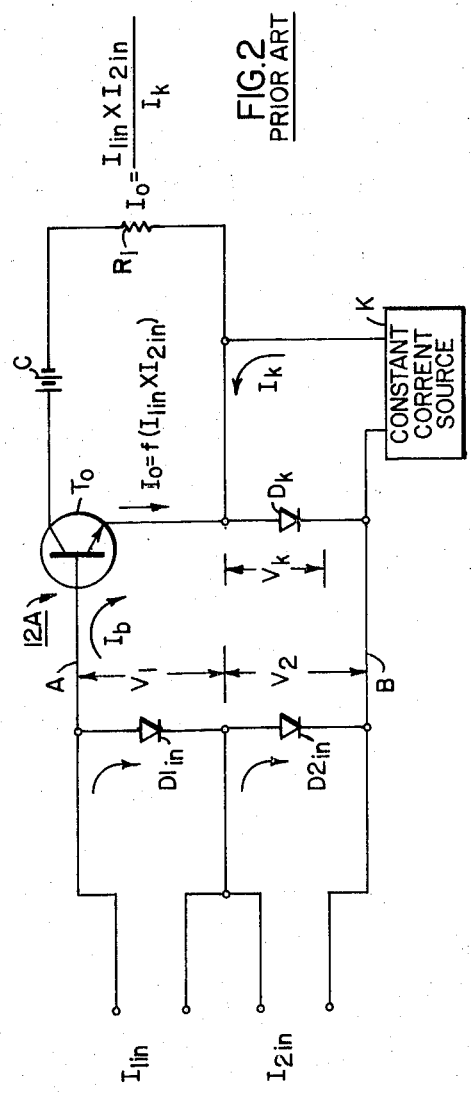
FIG. 2 is a schematic circuit diagram of a prior art logarithmic multiplier.

Before describing the logarithmic multiplier 12 of the electronic wattmeter 10 in detail, the prior art solid state logarithmic multiplier 12A illustrated in FIG. 2 is briefly described to aid in understanding the present invention. The multiplier 12A is the same single quadrant type having four computing devices as utilized in the electronic wattmeter 10 and has four solid state devices. Semiconductor diodes $D1_{in}$ and $D2_{in}$ define first and second input computing devices having pn junctions through which first and second input current signals $I_{1in}$ and $I_{2in}$ flow as shown. The diodes are connected in a series aiding relationship. In accordance with the characteristics of a pn junction, the voltages $V_1$ and $V_2$ developed thereacross are logarithmically related to the base e to the junction current. These junction voltages, $V_1$ and $V_2$, across the diodes $D1_{in}$ and $D2_{in}$ are summed across the conductors A and B since they are connected to the outer ends of the diodes. The summed voltages V1 + V2 are a function of the sum of the logarithims of $I_{1in}$ and $I_{2in}$.

A third and output computing device is formed by an npn transistor $T_o$. The transistor $T_o$ is utilized as an anti-logarithmic computing element having a collector to emitter circuit connected in series with a battery C and a load resistor $R_1$. The summed voltages, voltages $V_1$ + $V_2$ are applied across the base to emitter junction having a current $I_b$ and, in accordance with idealized conditions, the collector to emitter current flow is a computed output signal $I_o$ which is a function of the product of the first and second input signals $I_{1in}$ and $I_{2in}$ expressed by the equation $I_o = f(I_{1in} \times I_{2in})$.

A fourth compensating-computing device utilized for compensation in the multiplier 12 includes diode $D_k$ having a pn junction matching the pn junction characteristics of the diodes $D_{1in}$ and $D_{2in}$ and being connected to the base to emitter junction of output transistor $T_o$. The diode $D_k$ is in a series loop circuit formed with diodes $D_{1in}$ and $D_{2in}$ so as to be poled in a series opposing relationship. A control current $I_k$ supplied by a constant current source K develops a logarithmically related junction voltage $V_k$ subtracting from the voltages $V_1$ and $V_2$. Accordingly, the actual computed output signal $I_o$ can be expressed by the equation $I_o = (I_{1in} \times I_{2in})/I_k$.

In accordance with the basic logarithmic multiplier described above, the logarithmic multiplier 12 includes first and second input computing device of the logarithmic type formed by first and second input npn transistors T1 and T2 each connected as a diode by having the collector directly coupled to the base. This provides a pn junction having logarithmic related current and voltage characteristics. The collector to emitter circuit of the transistor T1 is connected in series with the collector to emitter circuit of the transistor T2 and to a common junction 46 connected to the conductor 42. The collector of the transistor T1 is connected to the conductor 41 so that the current input signal $I_1$ flows in series through the emitter to collector circuit of the transistor T1 from the output junctions 40C and 40D of the first rectifier bridge 40. The emitter of the transistor T2 is connected in series with the diodes D11, D12 and D13, and, accordingly, the conductor 44 so as to be included in a series current path flowing between the outputs 43C and 43D of the second rectifier bridge 43.

The transistor T1 and T2 have identical logarithmic relationships between the current of signals $I_i$ and $I_v$ flowing through the respective collector-to-emitter input circuits and the voltage developed across the collector to emitter circuits due to the currents flowing therethrough. Since the transistors T1 and T2 are connected in a series aiding relationship the logarithmically developed voltages thereacross are added and are applied together across conductors 47 and 48 connected to the collector of the transistor T1 and the emitter of the transistor T2, respectively. An output computing device of the anti-logarithmic type is formed by an output npn transistor T3 having a base to emitter circuit connected in series with the conductor 47 and a conductor 49. The output transistor T3 is the output device of the multiplier 12 with the collector to emitter circuit developing a collector current which is the computed output signal $I_o$ as described hereinbelow.

A compensating computing device is included in the logarithmic multiplier 12 by an npn transistor T4 which is connected as a diode to have characteristics substantially matching the transistors T1 and T2 and being connected to perform a dividing computational function. The transistor T4 is connected so that the base is coupled directly to the collector and the emitter is connected directly to the conductor 48 with the common base-collector connection connected to the emitter of the output transistor T3. This connects the collector to emitter circuitry of input transistors T1 and T2 and the base to emitter circuit of output transistor T3 in a common series circuit. The transistor T4 maintains the appropriate gain of the multiplier circuit 12 and compensates for transistor action variations including thermal drift of transistor T1 and T2. It is noted that the collector to emitter circuit of the transistor T4 is connected in series opposition with the collector to emitter circuits of the input transistors T1 and T2 and is also connected in series with the base to emitter circuit of the output transistor T3 so as to operatively divide the computation of the multiplier 12.

As adjustable constant current gain source 51 is formed by transistors T5, T6 and T7. The collector to emitter circuit of the transistor T7 is connected so that the emitter is in series with variable resistor R3 and the conductor 52. The transistor T7 and the resistor R2 are connected such that the base to emitter circuit of the transistor T7 is connected in series with each emitter to collector circuit of the transistors T5 and T6 and the collector of T7 is connected to the emitter of transistor T4. The transistor T5 and T6 have the bases directly coupled to their commonly connected collectors and the emitter of the transistor T6 is connected to the conductor 52. Accordingly, the emitter of the transistor T5 is connected to the base of transistor T7 so as to control the base to emitter biasing thereof. A resistor R4 connects the emitter of transistor T5 to the conductor 53 connected to the junction 54 at the collector of the transistor T4. A constant current is applied through the transistor T4 so as to provide a desired ratio in the level of the computed output signal $I_o$ developed through the collector to emitter circuit of the transistor T3 and for thermal compensation of the transistors T1 and T2. A noise filtering capacitor C2 is connected across the collector to emitter circuit of the transistor T4.

The logarithmic 12 includes an error reduction circuit designated generally by numeral 56 and includes two twin transistors T8 and T9 having identical dual matched transistors T8A and T8B and T9A and T9B, respectively. Transistors T8A and T9A each have bases and collectors directly coupled together with the collector of T8A connected to conductor 58 which is connected in series with the collector of the output transistor T3. The collector of T9A is connected to the emitter of T8B. The bases of the transistors in each twin transistor are directly connected together and the emitters of the transistors in each twin transistor are connected directly together. The collectors of the transistors T8B and T9B are coupled together at conductor 59 connected in series to a resistor R5 and the conductor 53 which is connected to the junction 54 between the transistors T3 and T4. Accordingly, the common base connection between the transistors T9A and T9B is connected to the common emitter connection of the twin transistor T8. The common emitter connection of the twin transistor T9 is coupled to conductor 61 and a Zener diode ZD1 having a polarity shown in the drawing and connected serially with the junction 54 at the emitter of the output transistor T3. The diode ZD1 maintains the voltage across the collector to emitter circuit of the output transistor T3 substantially constant at about 10 volts.

The collector voltage variations at the collector of T3 are minimal due to the values of the circuit elements selected to give the desired levels of output signals on conductors 58 and 59. The twin transistors T8 and T9 amplify the collector current at the collector of the output transistor T3 by a factor of three to maintain the transistor T3 at an optimum operating point. The gain of three is achieved since both the twin transistors T8 and T9 have the dual pnp matched transistors. With the base, emitter and collector connections as described, each transistor of the twin transistor arrangements T8 and T9 will carry a current equal to the current carried by its dual. Thus, the current flowing through the collector of the output transistor T3 causes the transistor T8A to carry the same current and the collector current of the transistor T8B will be identical. The current through the collector to emitter circuit of the transistor T9A is the sum of the current carried by the transistors and of the twin transistor T8 which is equal to twice the current flowing at the collector of the output transistor T3. The collector current of the transistor T9B is then equal to the same current as carried by the transistor T9A.

The source to drain circuit of field effect transistor (FET) T10 is connected to both of the collectors of transistors T8B and T9B and therefore conducts the sum of the collector currents of these two transistors. Accordingly, the current $I_{out}$ supplied to the FET T10 is equal to three times the current $I_o$ flowing at the collector of the output transistor T3 and the FET T10 reduces the voltage variations at the collectors of the twin transistors T8 and T9 by supporting all of the voltage changes. The source and drain electrodes of the FET T10 are also connected in series with the diode D15 poled in a forward direction of conduction so that the cathode terminates at a positive output terminal 63 of the electronic wattmeter 10. The current conducted through the FET T10 is a compensated output signal of the logarithmic multiplier 12 due to the circuit 56 and Zener diode ZD1. A negative output terminal 64 of the electronic wattmeter 10 is connected to a grounded conductor 65. The power indicating signal $I_p$ flows through the output terminal 63 and 64 connected to a load resistor $R_1$ in accordance with the operation of the polarity restorer 36 described in detail hereinbelow.

Referring now further to the portion of the electronic wattmeter illustrated in FIG. 3, the product of the polarity logic 30 receives the voltage and current digital pulse signals $P_v$ and $P_i$ from the polarity sensor section 28 of the signal conditioner 20. The conductors 45A, 45B and 45C are connected to corresponding conductors illustrated in FIG. 3A to apply voltage and current digital pulse signal $P_v$ and $P_i$ to the relative polarity comparator 32. A pair of substantially identical and balanced saturating amplifier circuits 70 and 72 are included in the comparator 32. The saturating amplifiers 70 and 72 are high impedance high gain amplifiers for developing a three level polarity product logic pulse signal $P_{iv}$ across the conductors 73 and 74 in response to the signals $P_i$ and $P_v$. The saturating amplifier 70 includes a constant current source npn transistor T11 having an emitter connected through the resistor R6 to the conductor 75. The collector to emitter circuit of a second constant current transistor T12 is connected in series with the source and drain electrodes of a field effect transistor (FET) T13 which in turn is connected in series with the collector to emitter circuit of transistor T11. A field effect transistor (FET) T14 which is substantially identical to the FET T13 includes source and drain electrodes connected between a conductor 76 normally poled positive relative to the conductor 75 and the source electrode of the FET T13. The gate electrode of FET T14 is connected to the conductor 45C and gate electrode of the FET T13 is connected to the conductor 45A so that the saturating amplifier 70 is responsive to the signal $P_v$. The FET T14 is effective to isolate the conductor 76 from the logic 30 and to apply appropriate biases to the FET T13 such that the FET's and T14 will include identical current flow. A resistor R7 connects the emitter of transistor T12 to the conductor 76 with the conductor 75 supplying power to the circuits of logic 30. The transistor T11 operating as a constant current source draws twice the current level that flows through the transistor T12.

The saturating amplifier circuit 72 corresponds identically to the saturating amplifier 70 and includes a constant current source transistor T15 which matches the transistor T12 and includes an emitter to collector circuit connected thorough a resistor R8 to the conductor 76. The resistor R8 has the same value as the resistor R7. The base of the transistor T15 is connected to the base of the transistor T12 and these commonly connected bases are connected to one end of a pair of series diodes D16 and D17 having the other end connected to the conductor 76. The diode D16 provides a predetermined forward voltage drop for compensation of the base to emitter voltage drop of the constant current transistors T12 and T15 and the diode D17 provides a predetermined bias for maintaining the voltage level for both the transistors T12 and T15. The saturating amplifier 72 further includes a pair of matched field effect transistors (FET's) T16 and T17 corresponding to the FET's T13 and T14. The connection of the FET T16 corresponds to the connection of the FET T13 with the source and drain electrodes connected in series with the emitter to collector circuit of transistor T15 and the gate electrode being connected to the conductor 45B. The source and drain electrodes of the FET T17 are connected across the conductor 76 and the source electrode of the FET T16. The gate electrode thereof is connected to the conductor 45C. A constant current source transistor T18 corresponding to the constant current source transistor T11 is connected with the collector to emitter circuit in series with the FET T16. The common bases of the transistors T11 and T18 are connected together and to a conductor 77. The emitter of the transistor T18 is connected to a resistor R9 which has an equal value to the resistor R6 with these connections, the input to the saturating amplifier 72 is connected across conductors 45B and 45C for applying the current digital pulse signal $P_i$.

The output of the relative polarity comparator 32 is developed across the conductors 73 and 74 which are connected to two junctions formed at the FET's T13 and T16 and the associated constant current transistors T11 and T18, respectively. The polarity product logic signal $P_{iv}$ is developed as described hereinafter. When the voltage across conductors 45B and 45C is positive, i.e., corresponding to the voltage digital signal $P_i$ being positive, the transistor T16 is biased harder into conduction and the constant current source transistor T15 will effectively attempt to take the increased voltage and continue to conduct a constant current value so a small change in the current of the FET T16 causes a large voltage change across the transistor T15. The result is that the voltage at the conductor 74 drops to a value of about twelve volts below the potential of the conductor 73. When the voltage across the conductors 45B and 45C is negative, the FET T16 conducts less current than the transistor T15 and the voltage at conductor 74 rises to a value of about 2 volts below the potential 9f conductor 73.

Correspondingly, a negative voltage across the conductors 45A and 45C, i.e., corresponding to a negative going voltage digital signal $P_v$, causes the FET T13 to draw less of the constant current supplied by the transistor T12 and the potential on the conductor 73 is approximately 12 volts below to the potential of conductor 74 and when the voltage across the conductors 45A and 45C goes positive the FET T13 tries to conduct harder with the result that the voltage on conductor 73 drops to a value of approximately 12 volts below the voltage of the conductor 74. The result of this operation develops the signal $P_{iv}$ across the conductors 73 and 74 to effectively subtract the voltage of conductor 74 from that of conductor 73 to thereby establish a reference value corresponding to one level of the three levels of the polarity product logic signal $P_{iv}$, for example zero volts. This occurs when the voltage and current digital pulse signals $P_v$ and $P_i$ have both positive or both negative polarities. When the voltage digital pulse signal $P_v$ is negative and the current digital pulse signal is positive, a positive 10 volts is developed as a second state of the signal $P_{iv}$ across the conductors 73 and 74. When the current digital pulse signal $P_i$ is negative and the voltage digital pulse signal is positive, a negative 10 volts is developed across the conductors 73 and 74 to establish the third state of the signal $P_{iv}$.

Referring now to the sign of the product logic output 34, an exclusive OR logic function circuit is formed by transistors T19, T20, T21 and T22 having an input connected to the conductors 73 and 74 so as to be responsive to the three voltage levels of the signal $P_{iv}$. The transistors T19 and T20 are connected in a differential amplifier circuit arrangement. The common emitter circuits of the transistors T19 and T20 include a resistor R10 and a resistor R11 which are identical. The junction of these resistors are connected to the collector to emitter circuit of the transistor T21 forming a constant current source. A current determining resistor R12 is connected between the emitter of the transistor T21 and the conductor 75. A biasing resistor R13 is connected between the base of the transistor T21 and the series connected diodes D16 and D17. A diode D18 is connected in series with a diode D19 with the polarities indicated between the base of the transistor T21 and the conductor 75. These later two diodes provide emitter to base compensation of the transistor T21 and establish a predetermined voltage level across the resistor R12. This determines the constant current characteristics of the transistor T21.

The base of each differential amplifier transistor T19 and T20 is connected to conductors 73 and 74, respectively. The collector of the transistor T19 is connected in series with a resistor R13 to the conductor 76 and, similarly the collector of the transistor T20 is connected through a resistor R14, which is identical to the resistor R13 to the conductor 76. A pair of opposingly connected series diodes D20 and D21 are connected across the collectors of the transistors T19 and T20 and the junction between these diodes is connected to the base to emitter input of the differential amplifier output transistor T22. A resistor R15 is connected between the base of the transistor T22 and the conductor 76 to provide appropriate biasing. The emitter to collector circuit of transistor T22 is connected so that the emitter is connected to the conductor 76 and the collector is connected in series through a resistor R16 to the conductor 75. Diodes D22 and D23 are connected in series with the conductor 76 to isolate the logic output 34 and the relatively polarity comparator 32. A diode D24 is connected at one end to the junction 78 at the collector of the transistor T22 and at the opposite end to both a conductor 79 and a resistor R17 connected between the diode D22 and the conductor 75. The junction of the diode D24 and the resistor R17 develops the two state digital polarity product signal $P'_{iv}$ which provides a switching control function at the input to the polarity restorer circuit 36 as described hereinbelow.

The differential amplifier transistors T19 and T20 operate at a unity gain factor. When reference level the three state signal $P_{iv}$ appears across the conductors 73 and 74 at the collectors of the transistors T19 and T20 each is approximately 0.8 volt. When the other two voltage levels of the signal $P_{iv}$ across the conductors 73 and 74 is either 10 volts positive or 10 volts negative, one of the transistors T19 or T20 will have a voltage of about 1.6 volts and the other will have a voltage of about 0 volt. The output transistor T22 is normally biased to cut-off but when either of the differential amplifier transistors T19 or T20 reaches a voltage of 1.2 volts or more it is biased into conduction.

The logic output 34 operates to develop pulse signals at junctions 81 and 82 of the collectors of transistors T19 and T20, respectively, which bias the transistor T22 conductive. The values of the diodes D20 and D21 are selected to substantially match the emitter to base voltage drop of the transistor T22 and are selected for operation with the diode D19 so that when both of the differential amplifier transistors T19 and T20 are conducting the constant current developed at the transistor T21 is equally divided through the collector to emitter circuits thereof. When one of the transistors T19 or T20 is conductive and the other is non-conductive, all of the constant current of the transistor T22 flows through the conducting transistor and develops sufficient voltage drop so as to render the transistor T22 conductive. The voltage developed across the resistor R16 is effective to develop two switching levels in the two state polarity product logic signal $P_{iv}$ for controlling the polarity restorer 36 as described hereinafter.

Referring now to the polarity restorer 36 shown in FIG. 3, a field effect transistor (FET) T23 is included therein for operation in a switching mode having either conducting or non-conducting states. The input is applied at the conductor 79 connected to the output of the product of the polarity logic 30 illustrated in FIG. 3 and described hereinbefore. The source to drain circuit of the FET T23 is connected in series with the source and drain electrodes of the FET T10 at the junction 84. The output signal of the multiplier circuit 12 is applied through the FET T10 to the junction 84. The diode D15 is connected between the junction 84 and the output terminal 63 as noted hereinabove, and enables operation of the polarity restorer 36 only when being poled in a reverse polarity in accordance with details of the polarity restorer described hereinafter.

The source electrode of the FET T23 is connected in series with a unity gain amplifier including the npn transistors T24 and T25. The collector to emitter circuit of the transistor T24 is connected in series with the source electrode of transistor T23 and has a directly connected collector and base. The emitter of transistor T24 is connected to the conductor 52. The base of the transistor T24 is directly connected to the base of the transistor T25 having the collector to emitter circuit thereof connected in series with the conductor 52 and the drain and source electrodes of a field effect transistor (FET) T26. The FET T26 is biased by potentiometer resistor R18 connected across output terminal 64 and conductor 52 and having a slider tap connected to the gate electrode. A filtering capacitor C3 is connected across the slider tap and the conductor 52. The FET T26 isolates the output terminal 64 from the transistors T24 and T25.

The FET T23 is operative to be biased either conductive or non-conductive in response to the voltage levels appearing at the conductor 79 being greater or less, respectively, than a predetermined switching level. The FET T23 is held non-conductive when the voltage level at conductor 79 is not sufficient to switch the FET T23. The junction 84 is isolated from the polarity restorer which is then isolated from the output terminal 63. This permits the logarithmic multiplier output signal $I_{out}$ to flow directly through the diode D15, to the output terminal 63 and through a suitable load such as provided by a 1,000 ohm resistor $R_1$ connected across the output terminals 63 and 64 with the later terminal grounded at junction 86 by a connection with conductor 65. This provides the positive direction of the power indicating signal $+I_p$ which has the same polarity as the multiplier output $I_{out}$ and is indicated by the solid arrow.

When the voltage at the gate exceeds the switching level, the FET T23 is rendered conductive. The conductive state reverse biases the diode D15 and shunts the multiplier output current $I_{out}$ through FET T23 and the transistor T24. The transistor T24 is applied across the base to emitter circuit of the transistor T25 so that current flows through the FET T26 which matches the current flow through the collector to emitter circuit of the transistor T24. Each of these currents is equal to the multiplier output signal $I_{out}$ flowing from the junction 84. The current through the FET T26 is supplied by the potential developed at the conductor 52 such that current flows through the potentiometer resistor R18 and to the output terminal 64, through the load resistor $R_1$ and to the output terminal 63. This develops the negative direction of the power indicating signal $-I_p$ indicated by the dashed arrow 88. The transistor T25 maintains the current through the FET T26 and in turn the FET T26 establishes the collector current of the transistor T26 and isolates T24 and T25 from the output terminal 64 and, accordingly, when the FET T23 is conductive so that the output current $I_{out}$ of the logarithmic multiplier circuit 12 flows in an opposite direction at the electronic wattmeter output.

The operation as described hereinabove of the polarity restorer 36 inverts the polarity of the logarithmic multiplier circuit output signal $I_{out}$ by reversing the direction of the current flow of the signal $I_p$ between the output terminals 63 and 64. With reference to the current component signal I and the voltage component signal V, a logarithmic multiplier 12 develops an output signal $I_{out}$ which is responsive to the product of absolute magnitudes of the voltage and current signals V and I whereas the polarity restorer develops the signal $I_p$ indicative of the product of the voltage and current signals in accordance with their relative polarity senses.

FIG. 3 illustrates a power supply arrangement for supplying the appropriate voltages and currents to the solid-state electronic wattmeter 10. Two regulated power supplies 92 and 94 are provided each having three output conductors isolated from each other. The first power supply 92 includes a grounded output conductor 92A is connected to the conductor 65 at junction 93 to form a grounded reference conductor. Positive and negative output conductors 92B and 92C, respectively, are connected to the conductors 61 and 52 at circuit junctions 95A and 95B, respectively. The conductors 92B and 92C develop plus and minus 15 volts d.c. relative to the conductor 92A for the preferred embodiment of the electronic wattmeter shown in FIGS. 3 and 4.

The second power supply 94 includes a common output conductor 94A and positive and negative output conductors 94B and 94C which are capable of developing plus and minus 15 volts d.c. relative to the common output conductor 94A. The conductor 48 shown in FIG. 3 is connected at circuit junction 96 to the output conductor 94A. The output conductors 94B and 94C are connected to conductors 76 and 75 at the circuit junctions 97 and 98 illustrated in FIG. 4. A further power supply connection is provided by a conductor 100 having a series resistor R19 connected between the circuit junction 101 of the conductor 44 illustrated in FIG. 3 and the circuit junction 102 of the conductor 76 illustrated in FIG. 4.

Figure 4:
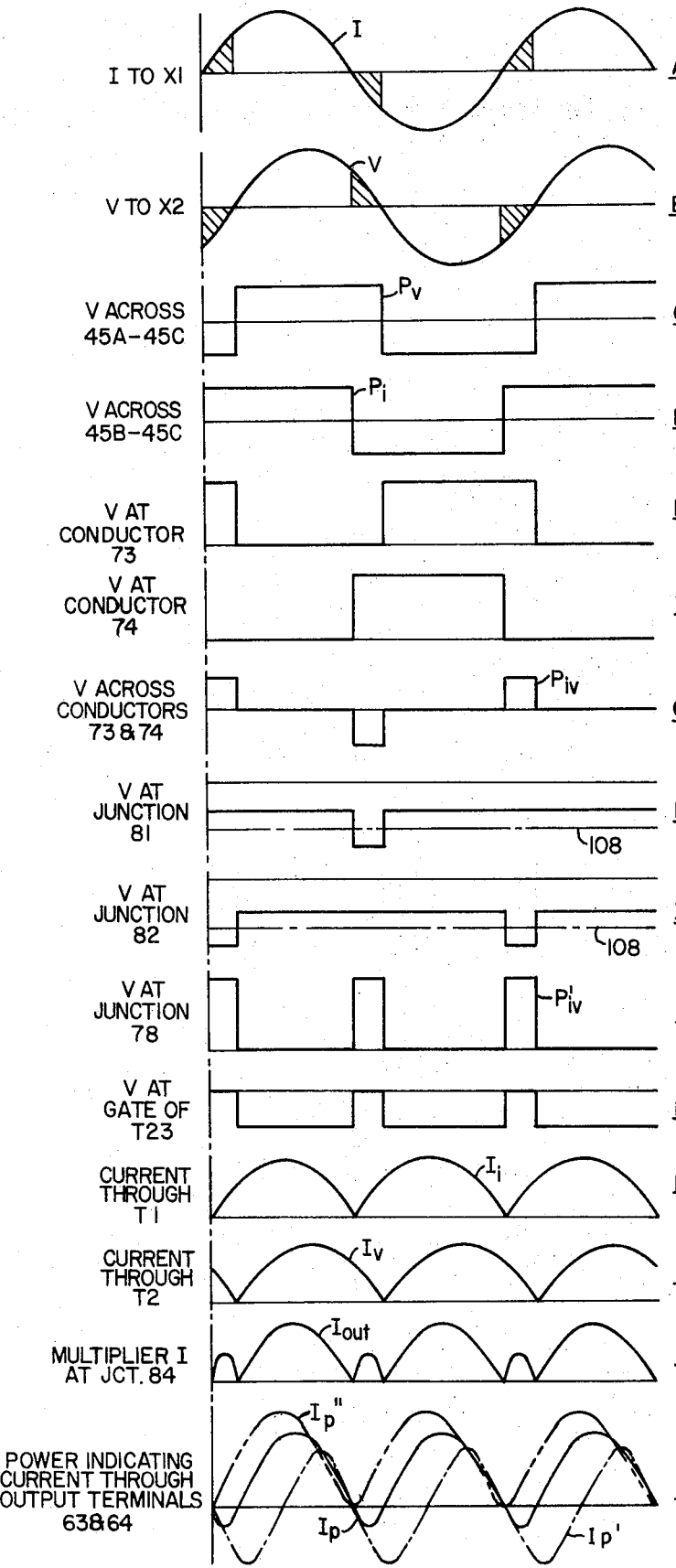
FIG. 4 illustrates graphs labelled by letters A through L of signal waveforms occurring at the designated portions of the schematic circuit diagrams illustrated in FIG. 3.

Reviewing briefly the operation of the electronic wattmeter 10 with reference to the graphs of waveforms which are shown in FIG. 4, in time relationship. Graphs A and B illustrate the curves of the current component I and the voltage component V defining the electrical power to be measured in the pair of conductors 14. The voltage component is illustrated lagging the current component I by approximately 45 electrical degrees for purposes of describing the operation of the invention. The shaded portions of the curves of the voltage and current components V and I indicate the times that the components have opposite phase relationships. The rectifier bridges 40 and 43 develop the rectified positive going analog current and voltage input signals $I_i$ and $I_v$ illustrated in graphs M and N in the conductors 41 and 44, respectively, and the common conductor 42 which are connected with the input logarithmic computing transistors T1 and T2 of the logarithmic multiplier 12. The signals $I_i$ and $I_v$ correspond to absolute values of the magnitude of the current and voltage components I and V and are phase displaced relative to each other in accordance with the amount of lagging or leading power factor existing in the electrical power in the pair of conductors 14. As described hereinabove, the logarithmic multiplier 12 operates in a single quadrant to develop a signal output $I_{out}$ derived from the product of the absolute values of the signals $I_i$ and $I_v$ and the circuit junction 84 as shown in the graph 0.

In order to derive the true instantaneous measure of power so that the signal $I_p$ is related to both the amplitude and polarity of the signals I and V, the product of the polarity logic 30 receives the current and voltage digital signals $P_i$ and $P_v$ from across the conductors 45A–45C and 45B–45C as shown in the graphs C and D. These signals are applied to the relative polarity comparator 32 as clamped voltages at either plus or minus 1 volt corresponding to the positive and negative polarities of the signals I and V. The output of the saturating amplifier 70 develops the signal at conductor 73 as shown in the graph E with respect to the conductor 76 in response to the signal $P_v$. The graph F illustrates the waveform of the signal on conductor 74 of the saturating amplifier 72 relative to the conductor 76 to develop in response to the signal $P_i$. Accordingly, the three state polarity product logic signal $P_{iv}$ is developed at the output of the relative polarity comparator 32 between the conductors 73 and 74 as indicated in the graph G.

The sign of the product logic output 34 develops the waveforms illustrated in the graphs H and I at the differential amplifier output circuit junctions 81 and 82. This is accomplished by voltages on one of the conductors 73 and 74 reaching a 10 volt level when the other is at a 0 volt level to develop the plus and minus 10 volt pulses shown in the waveform of graph G. The differential output transistor T22 is rendered conductive when the voltages at junctions 81 and 82 exceed a predetermined switching level of the transistor T22 indicated by the negative voltage level 108 in graphs H and I. The conductive state of the transistor T22 develops a voltage magnitude of 30 volts from a 0 volt reference potential at the junction 78 and across the resistor R16, as shown by the waveform signal $P_{iv}$ in graph J. The corresponding voltage developed across the gate to source electrodes of the FET T23 in the polarity restorer 36 is indicated by the waveform in graph K. When the signal of waveform is at a minus 7 volts level, the FET T23 is biased non-conductive so that the current signal $I_{out}$, shown graph 0, flowing to the junction 84 is permitted to pass through the diode D15 and through the load resistor $R_1$. This occurs when both of the signals V and I have a common positive or negative polarity. When the signal of waveform 112 rises to the 0 voltage level or above the FET T23 is rendered conductive so that a current equal to the positive portion of the $I_{out}$ signal flows in the reverse direction from the output terminal 64 to the output terminal 63 when signals I and V have opposite polarities as also indicated by the shaded portions of the corresponding waveforms shown in graphs A and B. This produces the waveform of the power indicating signal $I_p$ shown in graph L. It is noted that the portion of the waveform of the signal $I_{out}$ in graph 0 occurring during the shaded portions of the signals shown in graphs A and B is inverted in the waveform of the signal $I_p$ shown in graph L.

With varying power factors of the electrical power being measured the waveform of the signal $I_p$ will vary. In the graph L the waveform $I'_p$ indicates the shape at zero power factor, i.e., when the current and voltage components are 90 electrical degrees out of phase. At unity power, when the signals I and V are exactly in phase, the waveform $I''_p$ in graph L is developed. The circuit is arranged so that there will be 2.0 ma maximum peak to peak current for the signal $I''_p$. This will produce a convenient average value of 1.0 ma across the load resistor $R_1$. Correspondingly the average value of the signal $I'_p$ will go to zero indicating zero power factor. The power factors between zero and unity will be indicated by corresponding average values of the signal $I_p$ between 0 and 1 milliampere. These values are for maximum values of the current component I of 5 amperes and the voltage component V of 120 volts.

In the electronic wattmeter 10 described hereinabove a high degree of sensitivity and accuracy in the output of the wattmeter is provided in the logarithmic multiplier 12 by precisely controlling the operating point of the anti-logarithmic output transistor T3 in the logarithmic multiplier 12. I have found two additional sources of error in the operation of a basic prior art logarithmic multiplier as illustrated in FIG. 2 when incorporated in measuring circuits. These errors are due to the inherent operating characteristics of a basic logarithmic multiplier corresponding to the signal quadrant or so-called four transistor type disclosed. One source of error is attributed to the effect of the output voltage and current of the output transistor $T_o$ on the current signal applied through the base to emitter circuit thereof. Accordingly, as the collector voltage of tranisistor $T_o$ varies there is a non-linear variation in the base to emitter circuit which in turn varies the emitter current of a transistor $T_o$ so that there occurs a variation from the true anti-logarithmic value to be derived from the sum of the V1 and V2 produced across each of the logarithmic computing devices formed by the input diodes $D_{1in}$ and $D_{2in}$.

A second source of error is related to the forward current transfer ratio or beta of the output transistor $T_o$. Ideally, the logarithmic multiplier 12A of the prior art circuit is considered to have an infinite beta, i.e., in the order of 1,000, so that any beta related error is neglected. However, transistors typically utilized in logarithmic multipliers have often been found to have a beta between 50 and 100. This error is caused by the circulation of the output transistor base current, which is equal to the collector current divided by beta and which flows through all of the computing devices in a series loop formed by the logarithmic multiplier circuit.

The effects of the aforementioned sources of error were minimized in the logarithmic multiplier circuit 12 described for the electronic wattmeter 10 hereinabove by carefully optimizing the voltage and current measuring signals applied to the input to the multiplier circuit. Further the current amplification stages of circuit 56 in the multiplier circuit 12 was used to provide the desired level of the power indicating signal and in response to the output current of the output transistor T3. Further, compensation was provided by the Zener diode ZD1 which assisted in maintaining a constant voltage across the output transistor T3.

Figure 5:
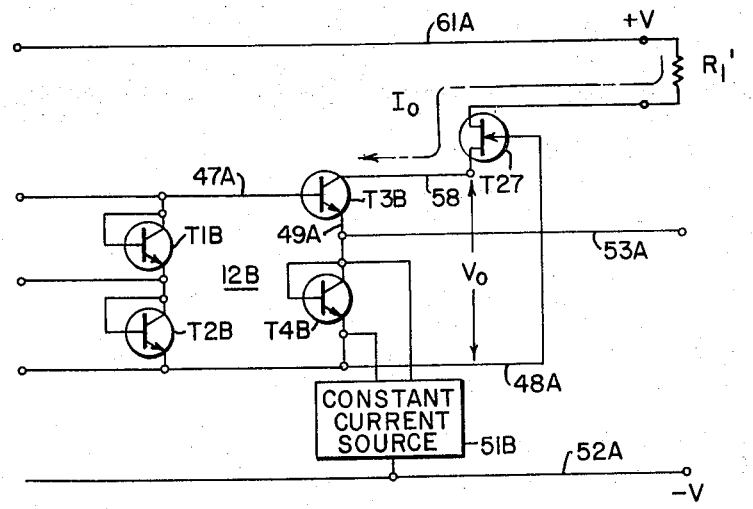
FIG. 5 is a schematic circuit diagram of an alternative embodiment of the solid state logarithmic multiplier illustrated in the electronic wattmeter in FIG. 3 for reducing undesired effects of the output signals on the input signals of the mutliplier transistor output device.
Figure 6:
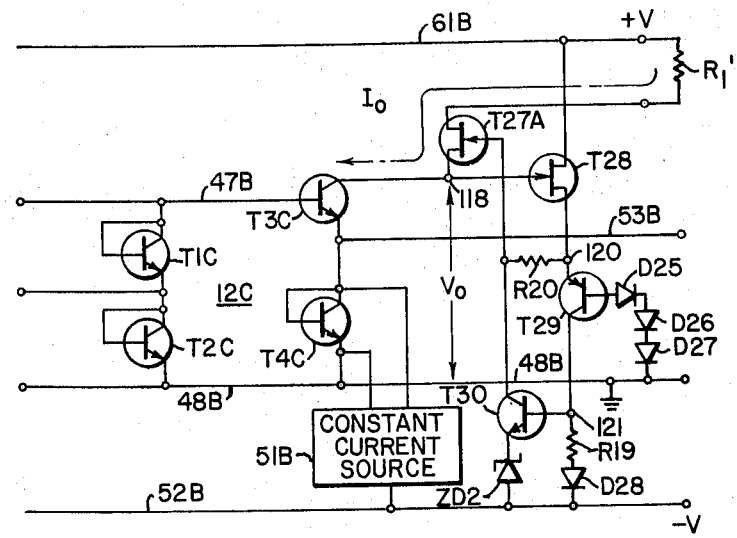
FIG. 6 is a schematic circuit diagram of an alternative embodiment of the logarithmic multiplier circuit shown in FIG. 5.
Figure 7:
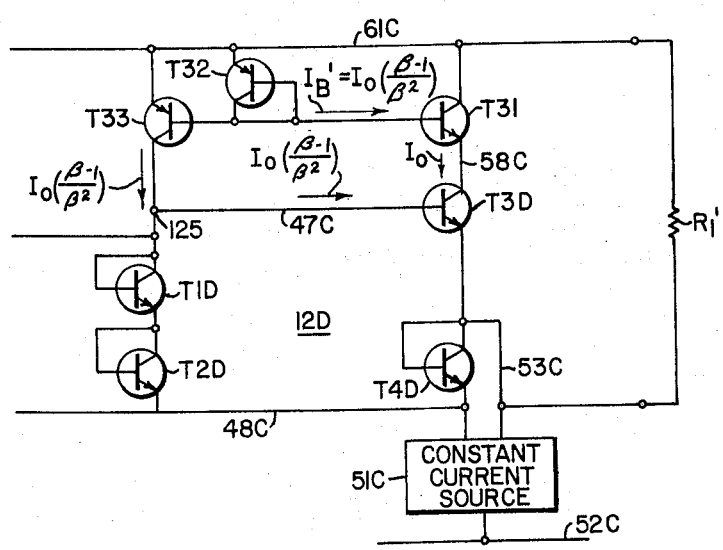
FIG. 7 is a schematic circuit diagram of a further alternative logarithmic multiplier circuit including beta compensation.

In instances where the optimization of a logarithmic multiplier as described for the logarithmic multiplier 12 is not found or such optimization does not sufficiently compensate to provide the desired accuracy in the operation of the circuit, I have found that the circuit disclosed in in FIGS. 5 and 6 have been successful in compensating for the output voltage related errors and the circuit disclosed in FIG. 7 has been used successfully to reduce the beta related errors in the operation of the logarithmic multiplier circuits.

Before describing the circuits illustrated in FIGS. 5 and 6 in detail, the causes of the output voltage related errors is briefly described for a better understanding of the operation of the circuit shown in these figures. It is generally known that in a bipolar transistor the emitter to base voltage is equal to a first constant K1 plus a second constant K2 multiplied times the natural logarithm of the emitter current. This is expressed as an equation $V_{e-b} = K1 + K2 \ln I_e$. Since the emitter current is related to the collector by the transistor gain alpha to the equation becomes $V_{e-b} = K1 + K2 \ln I_c/a$. It is known that the constants K1 and K12 are a function of the collector to emitter voltage of a transistor. Accordingly, the variations in the collector voltage affects the emitter base voltage so as to induce error into the emitter current which in turn introduces error in the collector current which is the information bearing signal of the logarithmic circuit referred to as the output current. It is desirable, for compensation of the output voltage variations, that the collector current be solely or substantially a function of the emitter to base voltage. This requires that the collector to emitter voltage be substantially constant with any alteration of the collector current.

Referring now more particularly to FIG. 5, a logarithmic multiplier 12B having a computing circuit corresponding to that shown in the logarithmic multiplier 12 of FIG. 3 includes logarithmic computing input devices formed by transistors T1B and T2B corresponding to the input transistors T1 and T2 in FIG. 3, an output transistor T3B corresponding to the output transistor T3 and a compensating computing device formed by transistor T4B corresponding to the transistor T4. An adjustable constant current source 51B is connected across the transistor T4B in accordance with the operation of a logarithmic multiplier circuit as described for a corresponding source 51 in FIG. 3. The circuit 12B is modified from basic four element type shown in the circuit of FIG. 2 by the addition of a field effect transistor (FET) T27. Conductors 47A, 48A, 52A, 53A and 61A correspond to the corresponding conductors 47, 48, 52, 53 and 61 shown in FIG. 3 to form a multiplier circuit and for connection to a power supply arrangement as shown in FIG. 3. The multiplier computed output signal $I_o$ flows through the load resistor R1 connected between conductor 61A and the FET T27.

The source and drain electrodes of the FET T27 are connected in series with the collector of the output transistor T3B which develops the current $I_o$, and the load resistor R1'. The field effect type of transistor T27 is utilized since it has the characteristic of having drain to source current being independent of the voltage at the drain electrode. With this connection the output transistor T3B then supports only the source to gate voltage of the FET T27 which is in the order of 1.2 volts. This substantially drops the voltage normally supported at the collector of a multiplier output transistor $T_o$ when connected as shown in the basic prior art circuit of FIG. 2 and the FET T27 effectively becomes a dependent current source. The drain to source current is independent of the drain voltage but the drain to source current is determined by the collector current ($I_o$) of the output transistor T3B. Calculation of the accuracy was found somewhat difficult in the circuit shown in FIG. 5, however, it is believed that the total error is in the order of plus or minus 0.3 percent per volt in variation of the output voltage. Some error is believed in the circuit illustrated in FIG. 5 due to small variations in the gate to source voltage as the collector current of the output transistor T3B varies. This gate to source voltage variation in turn is applied to the collector of T3B and in turn the collector current is effected even though the gate current of the FET T27 is negligible and may be neglected in most applications.

Referring now to FIG. 6, there is illustrated a modified circuit 12C of the circuit 12B of FIG. 5 for further compensation of the output voltage effects causing the slight error noted in the logarithmic multiplier 12B. The input transistors T1C and T2C, the output transistor T3C and compensating transistor T4C correspond respectively to the transistors T1B, T2B, T3B and T4B in FIG. 5. The conductors 47B, 48B, 52B, 53B and 61B correspond, respectively, to the conductors 47A, 48A, 52A, 53A and 61A of FIG. 5. A constant current source 51B is also provided corresponding to source 51A. The above-mentioned source of error in the circuit of FIG. 5 is substantially eliminated by the use of a voltage feedback regulating circuit arrangement connected between the gate electrode of a field effect transistor (FET) T27A corresponding to the field effect transistors T27 in FIG. 5 and the collector of the output transistor T3C. A second field effect transistor (FET) T28 is connected with its gate electrode connected to the collector of the output transistor T3C at the circuit junction 118 for sensing the collector voltage. The drain and source electrodes are connected in series with the power conductor 61B. The FET T28 is used because the gate current is essentially zero and is operated so as to provide a high gain amplifier circuit. The source electrode of the FET T28 is connected in series with the emitter to collector circuit of a pnp transistor T29. The circuit junction 128 between the source of the FET T28 and the emitter of transistor T29 is connected through a biasing resistor R20 to the gate electrode of the FET T27A. The base of transistor T29 is connected through three voltage reference diodes D25, D26, and D27, to the emitter of transistor T4C. The collector of transistor T29 is connected in series with a resistor R19 and a diode D28 to the conductor 52B.

A transistor T30 is provided with the collector to emitter circuit connected in series with the gate of the FET T27A and a Zener diode ZD2 which is connected to the conductor 52B. The base of the transistor T30 is connected to the circuit junction 121 of the collector of the transistor T29 and the resistor R19 so that the resistor R19 and diode D28 provide a control for the constant current characteristics of the transistor T30. The Zener diode ZD2 forms a voltage reference source for operation of the transistor T30 in an amplifier mode as well as a constant current source mode.

The transistor T30 is operated in the active region, i.e., the voltage at the base is greater than the Zener voltage plus the base to emitter voltage of the transistor T30. An exact current value from the collector of T29 is controlled to produce a Zener voltage plus the base to emitter current voltage and also to supply the base current to the base at transistor T30. Since the base current is negligible the resistor R19 and diode D28 form a constant current source. The constant current flow through the emitter to collector circuit of transistor T29 causes the current of the FET T28 to be constant. With the FET T28 current being constant and biased in an active region, the gate to source voltage of the FET T28 will be constant. This provides the voltage output $V_o$ of the logarithmic multiplier 12C which is the voltage between the collector of transistor T36 and the conductor 51B to equal the gate to source voltage drop of the FET T28 plus the emitter to base voltage drop of transistor T29 plus the voltage drops of the three voltage reference diodes D25, D26 and D27.

In operation, as the output voltage $V_o$ at the collector of transistor T3C tries to increase, the gate to source voltage at the FET T28 tries to increase causing more current in the drain to source circuit of the FET T28. This increased current drives the transistor T30 harder into conduction so as to reduce the voltage at the gate of FET T27A. This biases the FET T27A to conduct less current which will cause the transistor T3C to support less voltage because of its inherent tendency to draw a predetermined current level from the FET T27A. Accordingly, the transistor T3C will effectively transfer more voltage to the FET T27A and thereby itself develop less voltage.

The voltage compensating feature of the circuit shown in FIG. 6 provides the additional circuit feature to sense the voltage at the collector of the transistor T3C, also referred to as the output voltage $V_o$ of the logarithmic multiplier 12C, so that the slight output current dependency of FIG. 5 is compensated for by the voltage sensitive feedback circuit connected between the gate of the FET T27A and the collector of the transistor T3C. The FET T27A operates essentially the same in the circuit of FIG. 6 as the corresponding FET T27A does in the circuit of FIG. 5. The FET T27 or FET's T27A and T28 in FIGS. 5 or 6, respectively, can be replaced by an arrangement of transistors having conventional base, emitter and collector electrodes and being of a bipolar type if the beta is sufficiently high so as to have a base current which is substantially negligible. One example of this type of transistor arrangement is found in the so-called Darlington amplifier circuits which are well known to those skilled in the art of transistor circuits. The logarithmic multipliers 12B and 12C shown in FIGS. 5 and 6 can be used in electronic wattmeters of the type shown in FIGS. 1, and 3A so as to replace the logarithmic multiplier circuit 12 disclosed therein. The circuits of FIGS. 5 and 6 are not limited to such use and may be utilized where the multiplier circuits shown in 5 and 6 may be used to compute the product of two information signals applied to the input terminals of input computing devices T1B and T2B and T1C and T2C.

Referring now to FIG. 7 there is shown a logarithmic multiplier 12D for compensation of the aforementioned variations due to the beta characteristic of an output transistor T4D of a logarithmic multiplier 12D. The transistors T1D, T2D, T3D and T4D correspond to the transistors T1, T2, T3 and T4 in the logarithmic multiplier 12 shown in FIG. 3A. The conductors 47C, 48C, 52C, 53C and 61C correspond to the conductors 47, 48, 52, 53 and 61, respectively, of FIG. 3.

The error which is developed in logarithmic multipliers of the type described herein is due to the use of transistors having a beta in the order of 50 to 100 as noted hereinabove. Since the base current $I_B$ of transistor T3D, which is related to the beta of the transistor T3D, flows in a series loop through the collector to emitter circuits of the computing devices T1D and T2D and through the emitter to base junction of the output transistor T3D, I have found that the circuit shown in FIG. 7 including the npn transistor T31 and the pair of pnp transistors T32 and T33 is effective in substantially eliminating the flow of the beta-related current in the series loop mentioned above. The transistor T31 exactly matches the characteristics of the output transistor T3D. Accordingly, the beta characteristic of the transistor T31 exactly matches the beta characteristic of the transistor T3D.

The collector to emitter circuit of the transistor T31 is connected between conductor 61C and conductor 58C connected to the collector of transistor T3D. The transistor T32 is connected as a diode with the base and collector directly coupled and the emitter to collector circuit connected across the base to emitter circuit of the transistor T33. The collector to emitter circuit of transistor T33 is connected between the conductor 61C and the conductor 47C. The collector current of the transistor T3D then flows through the collector to emitter circuit of the transistor T31. Accordingly, the emitter to collector current of the transistor T31 and the emitter to base current of the transistor T33 is equal to the computed output current $I_o$ of the multiplier circuit. This creates a base current $I_B'$ at the base of the transistor T31 exactly matching the base current at the base of the transistor T3D. This current $I_B'$ is equal to $I_o$ B−1/B−2.

The pair of transistors T32 and T33 sense the magnitude in the base current at the base of the transistor T31 and develop a current at the collector of the transistor T33 which is exactly equal to the base current so as to be applied to the base of the transistor T3D at the circuit junction 125. The transistor T32 is a transistor connected as a diode to bias the transistor T33. The base of the transistor T33 is connected to the common junction of the collector and base of the transistor T32 so that the emitter to collector circuit of the transistor T33 is connected in series between the conductor 61C and the junction 125 to accurately reproduce the base current of the transistor T3D, i.e., a current amplification factor at unity gain, so as to have a collector current equal to the base current of the transistor T3D. In order to get the unity current amplification gain the transistors T32 and T33 must be closely matched. Accordingly, the collector current of the transistor T33 is applied to the junction 125 and becomes a source for the base current of the transistor T3D and does not flow through the input transistors T1D and T2D. Without the beta compensating circuit, the beta-related current of the transistor T3D would flow in the series loop of the multiplier circuit 120 and alter the computational information signals therein. This is accomplished by eliminating the base-current component due to the beta characteristic in the base to emitter circuit of the output transistor T3D from flowing through either the input transistors T1D and T2D or the compensating-computing transistor T4D.

In one specific application of the compensating circuit shown in FIG. 7 it has been employed in conjunction with the multiplier circuit disclosed in copending application Ser. No. 165,462, filed July 23, 1971 for a Low Cost RMS Transducer. The circuit disclosed therein has an improved accuracy by use of the circuit used in FIG. 7 from an accuracy in the order to 2% to an accuracy in the order of 0.1 percent. Further, the circuit shown in FIG. 7 may be incorporated in the electronic wattmeter circuit 10 described hereinabove.

While preferred embodiments of this invention have been illustrated and described in detail hereinabove, it is to be understood that the invention is not limited to the specific embodiments.

I claim as my invention:

1. An electronic wattmeter comprising:
   first and second input circuits adapted for connection to voltage and current components of a source of alternating current energy to be measured;
   first and second rectifier circuits connected to said first and second input circuits, respectively, for developing common polarity voltage and current sensing analog signals responsive in magnitude and phase relationship to said voltage and current components;
   a logarithmic multiplier circuit including first and second logarithmic computing devices, a balancing and compensating logarithmic computing device, and an anti-logarithmic computing device, each of said devices having an input and an output with said anti-logarithmic computing device input connected with the outputs of said first and second logarithmic computing devices so as to develop a computed output current responsive to the product of current flow in the inputs of said first and second logarithmic devices;
   means for coupling said input of the first logarithmic computing device to said voltage analog signal; means for coupling said input of the second logarithmic computing device to said current analog signal whereby said output of the anti-logarithmic computing device develops the computed output current so as to have varying values responsive to the product of the absolute values of said voltage and current components;
   means connected to said first and second rectifier circuits for developing first and second digital pulse signals each having either of two different magnitudes with each mangitude corresponding to one of the positive or negative polarity states of said voltage and current components, respectively;
   means responsive to said two magnitudes of each of said first and second pulse signals for comparing the magnitudes of said first and second digital pulse signals so as to establish a third pulse signal having first, second and third levels, said first level being established by the magnitudes of said first and second digital pulse signals indicating either of common polarity states of said voltage and current components, and said second and third levels being established by the opposite polarity states of said voltage and current components;
   means for developing a fourth pulse signal in response to said first, second and third levels of said third pulse signal, said fourth pulse signal having either of two signal levels such that one level is developed when the magnitudes of the first and second pulse signals correspond to opposite polarity states of said voltage and current components and the other level is developed when the magntiudes of the first and second pulse signals correspond to common polarity states of said voltage and current components;
   a pair of output terminals connected with said output of said anti-logarithmic computing device; and
   an inverting circuit connected between said output of said anti-logarithmic computing device and said pair of output terminals, said inverting circuit being responsive to said third pulse signal such that said one level thereof renders said inverting circuit operative to reverse the phase of said computed output current by reversing the direction of current normally generated through said pair of output terminals by said anti-logarithmic computing device, whereby current through said pair of output terminals is responsive to the true instantaneous value of power of said voltage and current components.

2. The electronic wattmeter as claimed in claim 1 wherein said logarithmic multiplier circuit includes solid state devices wherein said first and second logarithmic computing devices are input transistors having diode connected base and collector electrodes, said balancing and compensating computing device is a third transistor having a diode connected base and collector electrodes, and said anti-logarithmic computing device is an output transistor having a base to emitter input circuit connected in series with said input transistors and said third transistor and an emitter to collector output circuit.

3. The electronic wattmeter as claimed in claim 2 wherein said means for establishing said third pluse signal includes a pair of saturating amplifiers each including a constant current source, one transistor means with base, emitter and collector electrodes and another transistor means of the field effect type with gate, source and drain electrodes, wherein the emitter to collector circuit of each one transistor is connected in series with the source to drain circuit of one of said another transistor and with one of said constant current sources, wherein said first and second pulse signals are each applied to a separate one of said drain electrodes, and wherein said third pulse signal is developed across said collector electrodes, and said means for developing said fourth pulse signal further includes a logic circuit means responsive to said third pulse signal so as to generate one of said two signal levels when the levels of magnitude of said third pulse signal correspond to either of said states of opposite polarity of said voltage and current components and to generate the other signal level when the level of magnitude of said third pulse signal corresponds to said voltage and current components having a common polarity.

4. The electronic wattmeter as claimed in claim 3 wherein said means for developing said fourth pulse signal includes an exclusive OR function circuit having a pair of transistors with base, emitter and collector electrodes connected together in a differential amplifier configuration with each base electrode of a differential amplifier transistor connected to the collector electrode of a separate one of said one transistor means, and wherein a junction between said collector electrodes of said pair of differential amplifier transistors is effective to develop said fourth pulse signal in response to the three levels of magntiude of said fourth pulse signal.

5. The electronic wattmeter as claimed in claim 1 wherein said inverting circuit includes a diode serially connected to said output terminals, a pair of field effect transistors each having gate, source and drain electrodes, and a voltage source, wherein said drain and source electrodes of one field effect transistor are connected across a first series circuit thereof including said diode and said output terminals and said gate thereof is connected to said fourth pulse signal for rendering the one field effect transistor conductive when in said one signal level to thereby shunt normal current flow of said diode away from said output terminals, wherein the other field effect transistor is connected with the drain and source electrodes in parallel to both said first series circuit and a second series circuit including said output terminals and said voltage source, and wherein said pair of field effect transistors are connected together so that current through said other field effect transistor is substantially identical to the current through the one field effect transistor and said current through said output terminals is in one direction when said one field effect transistor is nonconductive and in an opposite direction when said one field effect transistor is conductive.

6. The electronic wattmeter as claimed in claim 1 wherein said inverting circuit includes a diode serially connected between said output of said anti-logarithmic computing device and said output terminals for conducting current in one direction thereto, one field effect transistor having source and drain electrodes connecting the junction between said diode and the anti-logarithmic computing device output in a shunt path and further having a gate electrode connected to said third pulse signal for rendering the associated field effect transistor conductive when in said one signal level and nonconductive when in said other signal level, another field transistor having source, drain and gate electrodes wherein said source and drain electrodes are connected in series with a junction of said diode adjacent said pair of output terminals, a source of voltage being connected between said source and drain electrodes of said another field effect transistor and said output terminals, resistor means connecting said gate electrode thereof to said voltage source, and a biasing means connecting said drain electrodes of said one and another field effect transistors such that current through both field effect transistors are substantially identical when said one field effect transistor is rendered conductive and concurrently said diode is rendered nonconductive and the current through the output terminals is in an opposite direction relative when said diode is conductive.

7. The electronic wattmeter as claimed in claim 2 wherein said logarithmic multiplier circuit includes an error reduction circuit for adjusting the collector to emitter current level of said output transistor so as to maintain a predetermined minimum of error producing variations thereof while generating a higher predetermined current level at said output terminals, said error reduction circuit including two dual connected transistors with the transistors of each dual having commonly connected emitter electrodes and commonly connected base electrodes, said base electrodes of a first dual connected to one collector electrode of one transistor therein and to said collector to emitter circuit of said output transistor, said emitter electrodes of the first dual connected to the base electrodes of a second dual and to a collector electrode of one transistor in the second dual, and said remaining collector electrodes of the two dual connected transistors connected together so that the common junction thereof develops said higher predetermined current level, and a field effect transistor having source and drain electrodes connected in series between the common collector junction and said output terminals and having the source electrode and a gate electrode connected across the emitter and collector electrodes of said second dual connected transistor to maintain minimum voltage variations thereacross.

8. An electronic wattmeter as claimed in claim 2 including a field effect transistor having source and drain electrodes connected in series with said collector to emitter circuit of said output transistor and the source electrode and a gate electrode connected across the collector to emitter circuit of said output transistor to maintain minimum voltage variations at the collector electrode of said output transistor.

9. An electronic wattmeter as claimed in claim 2 including one field effect transistor having source and drain electrodes connected in series with said collector to emitter circuit of said output transistor, another field effect transistor operated in a high gain amplifier mode wherein said another field effect transistor has a gate electrode connected to the collector of said output transistor and a feedback transistor means having a base biasing circuit connected in series with the source and drain electrodes of said another field effect transistor and an emitter to collector circuit connected to the gate electrode of said one field effect transistor whereby increasing voltage variations at the collector of said output transistor is decreased by said feedback transistor biasing said one field effect transistor so as to oppose such voltage variations.

10. A logarithmic multiplier circuit having first and second input transistors each having diode connected base and collector electrodes and the collector and an emitter electrodes connected in series adding relationship, each of said first and second transistors developing a voltage logarithmically related to current applied therethrough, a third compensating transistor having diode connected base and collector electrodes and the collector and an emitter electrodes connected in series with the first and second transistor, a constant current means connected across the collector and emitter electrodes of said third transistor, a fourth output transistor having base and emitter electrodes serially connected between said first and second transistors and said third transistor so as to develop a base current directly related to the combined voltages across said first and second transistors, said output transistors having emitter and collector electrodes developing a current through the collector to emitter circuit associated therewith anti-logarithmically related to said base current thereof, and a beta error reduction circuit comprising a fifth transistor substantially identical to said output transistor, said fifth transistor having a collector to emitter circuit connected in series with said collector to emitter circuit of said output transistor, and sixth and seventh transistors having commonly connected emitters, diode connected base and collector electrodes of said sixth transistor connected in turn to the base electrode of said fifth transistor and the base electrode of said seventh transistor and the collector and emitter electrodes of said seventh transistor connected between the collector electrode of said fifth transistor and the base electrode of said output transistor, whereby error producing currents related to the beta characteristic of said output transistor are substantially reduced in the base current of said output transistor by duplicating said error producing currents through the collector electrode of said seventh transistor in opposing relationship thereto.

11. The electronic wattmeter as claimed in claim 2 wherein said means for comparing said first and second pulse signals including a pair of saturating amplifiers, each of said pair of saturating amplifiers having an output responsive to one of said first and second pulse signals such that said third pulse is established across both of said outputs of the saturating amplifiers, and wherein said means for developing said fourth pulse signal includes an exclusive OR logic function circuit having inputs connected across said outputs of said pair of saturating amplifiers.

* * * * *